(12) United States Patent
Inada et al.

(10) Patent No.: US 9,638,425 B2
(45) Date of Patent: May 2, 2017

(54) CARTRIDGE-TYPE GAS GRILL

(71) Applicants: Iwatani Corporation, Osaka (JP); Asahi Seisakusho Co., Ltd., Saitama (JP)

(72) Inventors: Kenichiro Inada, Osaka (JP); Akio Wada, Saitama (JP)

(73) Assignees: Iwatani Corporation, Osaka (JP); Asahi Seisakusho Co., Ltd., Saitama (JP)

( * ) Notice: Subject to any disclaimer, the term of this patent is extended or adjusted under 35 U.S.C. 154(b) by 367 days.

(21) Appl. No.: 14/260,797

(22) Filed: Apr. 24, 2014

(65) Prior Publication Data
US 2015/0075516 A1 Mar. 19, 2015

(30) Foreign Application Priority Data
Sep. 13, 2013 (JP) .................................. 2013-190102

(51) Int. Cl.
A47J 37/07 (2006.01)
F24C 3/12 (2006.01)

(52) U.S. Cl.
CPC ............. *F24C 3/12* (2013.01); *A47J 37/0713* (2013.01); *A47J 2037/0777* (2013.01)

(58) Field of Classification Search
CPC .................................. F24C 3/12; A47J 37/0713
See application file for complete search history.

(56) References Cited

U.S. PATENT DOCUMENTS 3,538,907 A * 11/1970 Bowman ............. A47J 37/0713
126/214 R
5,546,853 A * 8/1996 Heil .................... A47J 37/0713
126/25 R
(Continued)

FOREIGN PATENT DOCUMENTS

JP H08-320122 A 12/1996

*Primary Examiner* — Avinash Savani
*Assistant Examiner* — Rabeeul Zuberi
(74) *Attorney, Agent, or Firm* — Osha Liang LLP

(57) ABSTRACT

A structure which performs safety operation with certainty when a gas container is replaced or when an abnormality occurs and is easy to used is provided. A cartridge-type gas grill 11 having a plurality of systems includes two gas container accommodation sections 12; two burners 13; and gas flow paths for connecting the gas container accommodation sections 12and the burners 13 in a one-to-one relationship. All the gas container accommodation sections 12 are each provided with a container attachment switch 19 for detecting that a gas container 15 is connected. Open/close valves 18, provided in the gas flow paths, for adjusting a gas flow are each formed of an electromagnetic valve. Operation knobs 63 each for making an operation on the corresponding open/close valve 18 are each provided with an ignition switch 20, which is turned ON when the corresponding open/close valve 18 is opened and is turned OFF when the corresponding open/close valve 18 is closed. The container attachment switches 19, the open/close valves 18, and the ignition switches 20 are electronically controlled. For an ignition process, the ignition switches are validated under the condition that all the container attachment switches 19 are ON. For a recovery process, all the ignition switches 19 need to be turned OFF.

4 Claims, 15 Drawing Sheets

(56) References Cited

U.S. PATENT DOCUMENTS

| | | | | |
|---|---|---|---|---|
| 5,645,042 A | * | 7/1997 | Tompkins, Jr. | A47J 37/0786 126/41 R |
| 6,133,554 A | * | 10/2000 | Clifford | A47J 37/0713 126/39 BA |
| 6,155,160 A | * | 12/2000 | Hochbrueckner | G05D 23/1917 126/112 |
| 2002/0073985 A1 | * | 6/2002 | Leukhardt, III | F23N 5/102 126/39 E |
| 2005/0168902 A1 | * | 8/2005 | Laflamme | G05B 23/0235 361/115 |
| 2008/0124667 A1 | * | 5/2008 | Schultz | F23N 1/022 431/18 |
| 2008/0190408 A1 | * | 8/2008 | Hsu | F24C 3/14 126/36 |
| 2014/0261378 A1 | * | 9/2014 | Barreto | A47J 37/0713 126/25 R |

\* cited by examiner

CARTRIDGE-TYPE GAS GRILL

BACKGROUND OF THE INVENTION

1. Field of the Invention

The present invention relates to a cartridge-type gas grill commonly referred to as a "cassette grill", and more particularly, to a structure for providing safety to a gas grill (twin burner type gas grill) including, for example, two gas containers and two gas flow paths reaching two burners.

2. Description of the Prior Art

In Japan, in conformity to the rules regarding product safety of gas devices, twin burner type gas grills as described above are structured so as not to discharge gas unless two gas containers are loaded, in order to guarantee safety. Therefore, when, for example, one of the gas containers in use becomes empty and is detached in order to be replaced with another gas container, an open/close valve located in a flow path for providing gas to a burner corresponding to the other gas container which still has gas therein is closed and thus the fire is extinguished.

However, if the new gas container is connected in this state, there is an undesirable possibility that gas leaks from the burner corresponding to the other gas container for which the open/close valve is opened when the new gas container is connected.

In order to avoid this, a safety device as disclosed in Patent Document 1 has been proposed.

This safety device has the following structure so that when one of the open/close valves is opened or when a gas container is detached in the state where one of the open/close valves is opened, another gas container cannot be connected in such a state. The safety device includes a spring, a pin or the like for preventing the connection. In addition, shafts of two, namely, left and right, operation knobs are associated with each other, so that when the shaft of one of the operation knobs is rotated in a direction of closing the valve, the rotation is transmitted to the shaft of the other operation knob. This structure using, for example, the spring, the pin or a helical spring for the associated operation is a mechanical structure.

Patent Document 1 describes that such a structure prevents a gas container with certainty from being connected in the state where gas may leak. It is also described that when one of the operation knobs is closed, the other operation knob is also closed, and therefore, inadvertent gas leak is prevented.

PRIOR ART DOCUMENT

Patent Document

Patent Document 1: Japanese Laid-Open Patent Publication No. Hei 8-320122

SUMMARY OF THE INVENTION

Problems to be Solved by the Invention

However, the structure for preventing the connection of the gas containers, which uses a spring, a pin or the like, may not operate accurately when, for example, foreign objects enter the grill or the spring is damaged or elongated. Especially, the associated operation of the operation knobs is realized by a helical spring. This involves a problem that the structure may not operate with certainty to prevent inadvertent gas leak.

The above-described measure for realizing the associated operation of the operation knobs also has the following problem. When heat of the left and right burners is to be adjusted independently, an operation of adjusting the heat of one of the burners influences the operation of adjusting the heat of the other burner. This prevents desired adjustment.

The present invention has a main object of providing a structure which performs safety operation with certainty and is easy to used.

Means for Solving the Invention

A cartridge-type gas grill according to the present invention has a plurality of systems and includes a plurality of gas container accommodation sections; burners of the same number as that of the gas container accommodation sections; and gas flow paths for connecting the gas container accommodation sections and the burners in a one-to-one relationship. The gas container accommodation sections are each provided with a container attachment switch for detecting that a gas container is connected. Open/close valves, provided in the gas flow paths, for adjusting a gas flow are each formed of an electromagnetic valve. Operation knobs each for making an operation on the corresponding open/close valve are each provided with an ignition switch, which is turned ON when the corresponding open/close valve is opened and is turned OFF when the corresponding open/close valve is closed. The container attachment switches, the open/close valves, and the ignition switches are connected to a control section. The control section controls the ignition switches to be valid under a condition that the control section receives an ON signal from all of the container attachment switches.

According to this structure, the control section electrically controls the ignition switches so as not to be validated unless all the container attachment switches are ON. Namely, ignition is made possible if only the gas containers are attached to all the gas container accommodation sections. In addition, the plurality of operation knobs are independent from each other. Therefore, the combustion state of each burner is independently and freely adjustable by operating the corresponding operation knob.

The container attachment switches, the open/close valves formed of electromagnetic valves, and the ignition switches associated with the operation knobs are connected to the control section to be electrically controlled. In addition, the flame detection sections for detecting flame in the burners and the temperature sensors for detecting overheating of mounted electric devices are also connected to the control section. Thus, the gas grill can be structured to detect that the flame is extinguished by the wind, overflow of a boiled liquid, that the gas container is out of gas, or an overheating state is caused. Such a structure provides the following effect. For re-combusting the gas after the flame is extinguished inadvertently, the grill is controlled so as not to ignite the gas unless all the operation knobs are closed once. In this manner, inadvertent gas leak or ignition can be prevented.

Effect of the Invention

According to the present invention, the operation for guaranteeing safety is performed electrically. Such an electric operation is performed with higher certainty than a mechanical operation. Since the control is executed electrically, the operation knobs do not need to be associated with each other mechanically. This allows the heat in each burner to be adjusted freely and desirably with high workability.

DESCRIPTION OF THE PREFERRED EMBODIMENTS

Hereinafter, one embodiment for carrying out the present invention will be described by way of the attached drawings.

Figure 1:
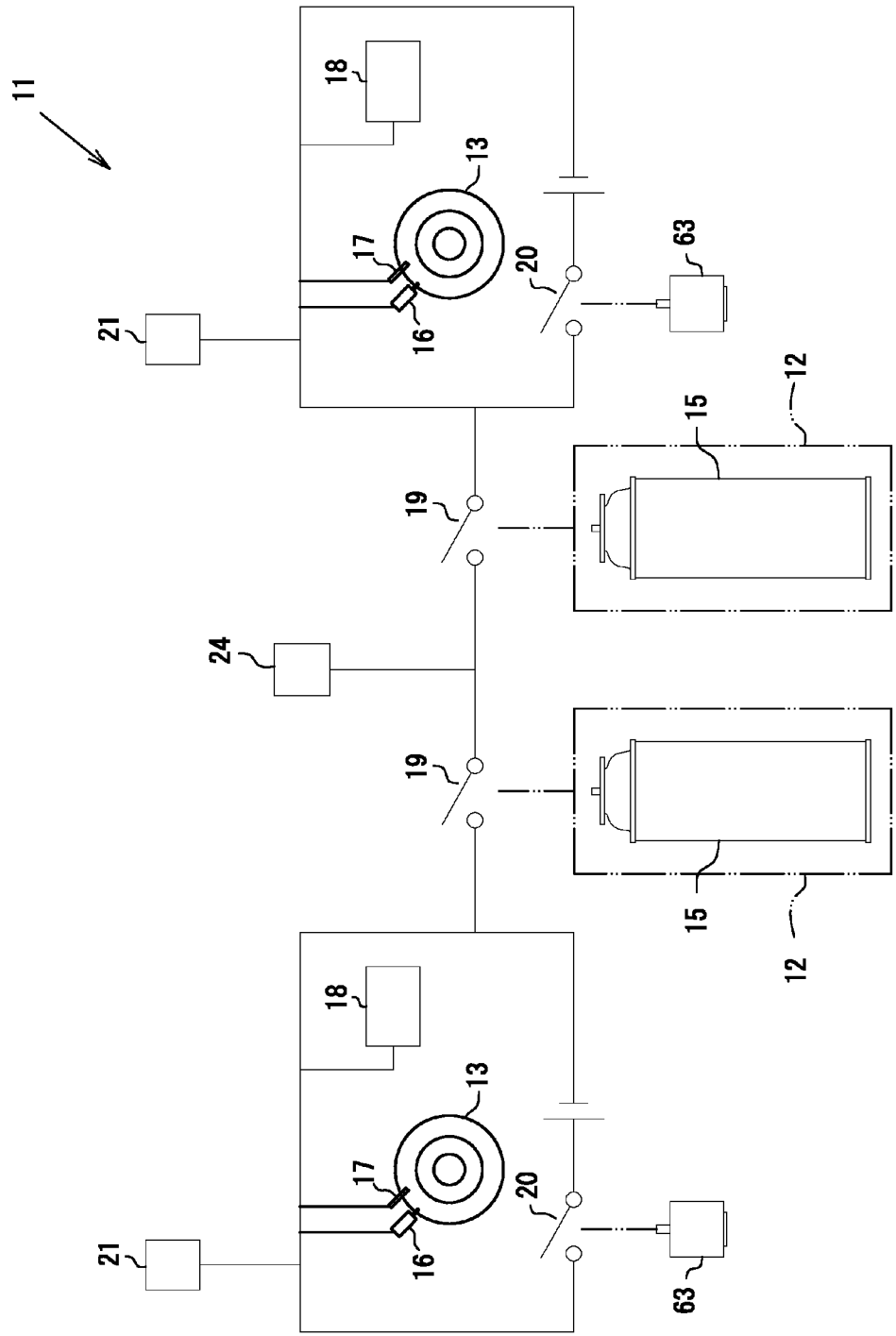
FIG. 1 is a schematic structural view of a cartridge-type gas grill.

FIG. 1 is a schematic structural view of a cartridge-type gas grill 11 (hereinafter, referred to as a "gas grill"). As shown in FIG. 1, the gas grill 11 is of a type having a plurality of systems and includes a plurality of gas container accommodation sections 12, burners 13 provided in the same number as that of the gas container accommodation sections 12, and gas flow paths for connecting the gas container accommodation sections 12 and the burners 13 to each other in a one-to-one relationship. The gas grill 11 shown in FIG. 1 is a twin burner type gas grill including two gas containers 15 and two gas flow paths reaching two burners 13.

Figure 2:
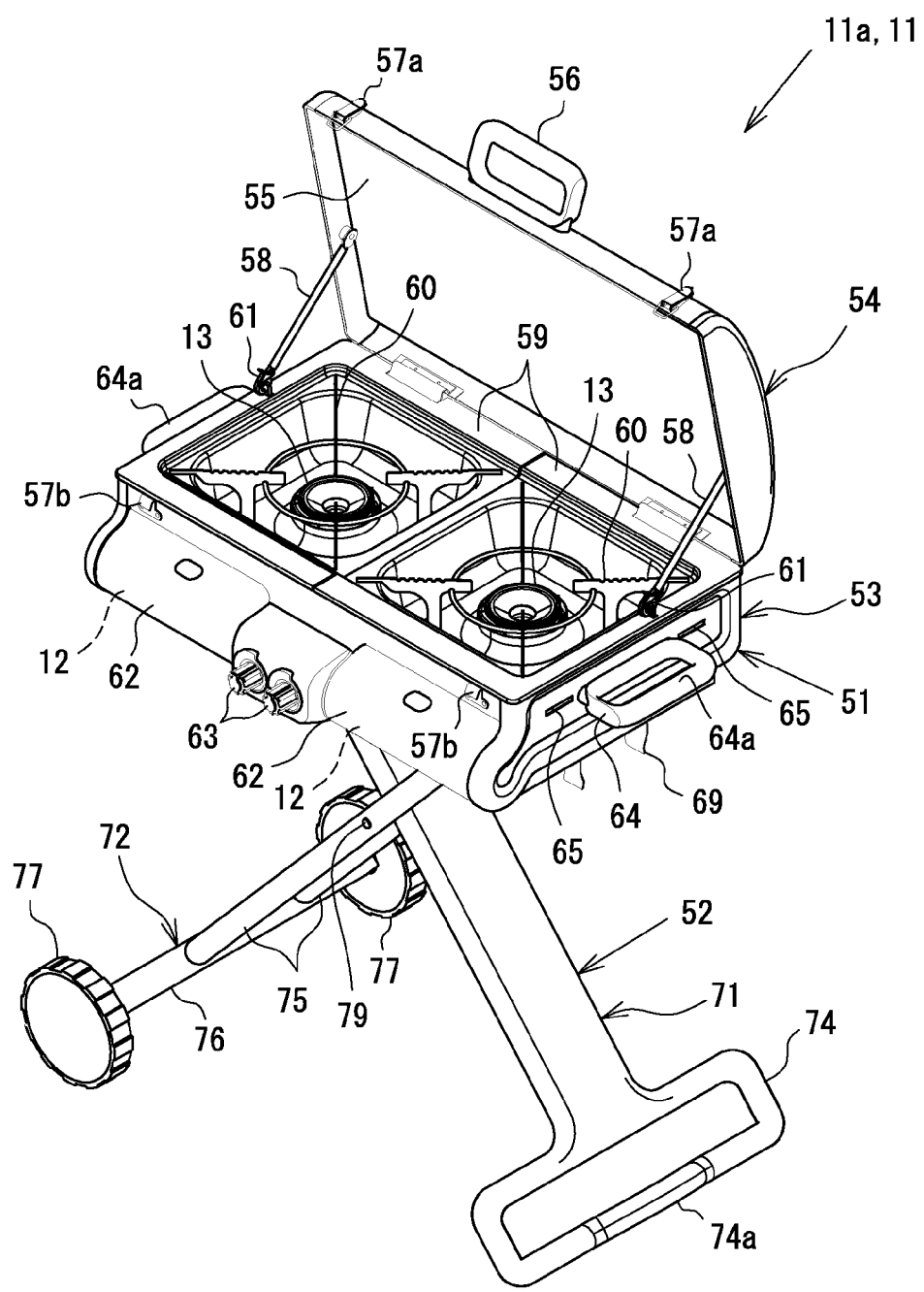
FIG. 2 is an isometric view of a barbecue grill with a lid being open.

Such a twin burner type gas grill 11 may be, for example, a barbecue grill 11a shown in FIG. 2. The barbecue grill 11a is preferably usable for having a barbecue outdoors.

First, an overall structure of the barbecue grill 11a will be described, and then, an inner structure thereof will be described.

The barbecue grill 11a includes a grill main body 51 and a leg section 52 for supporting the grill main body 51.

Figure 3:
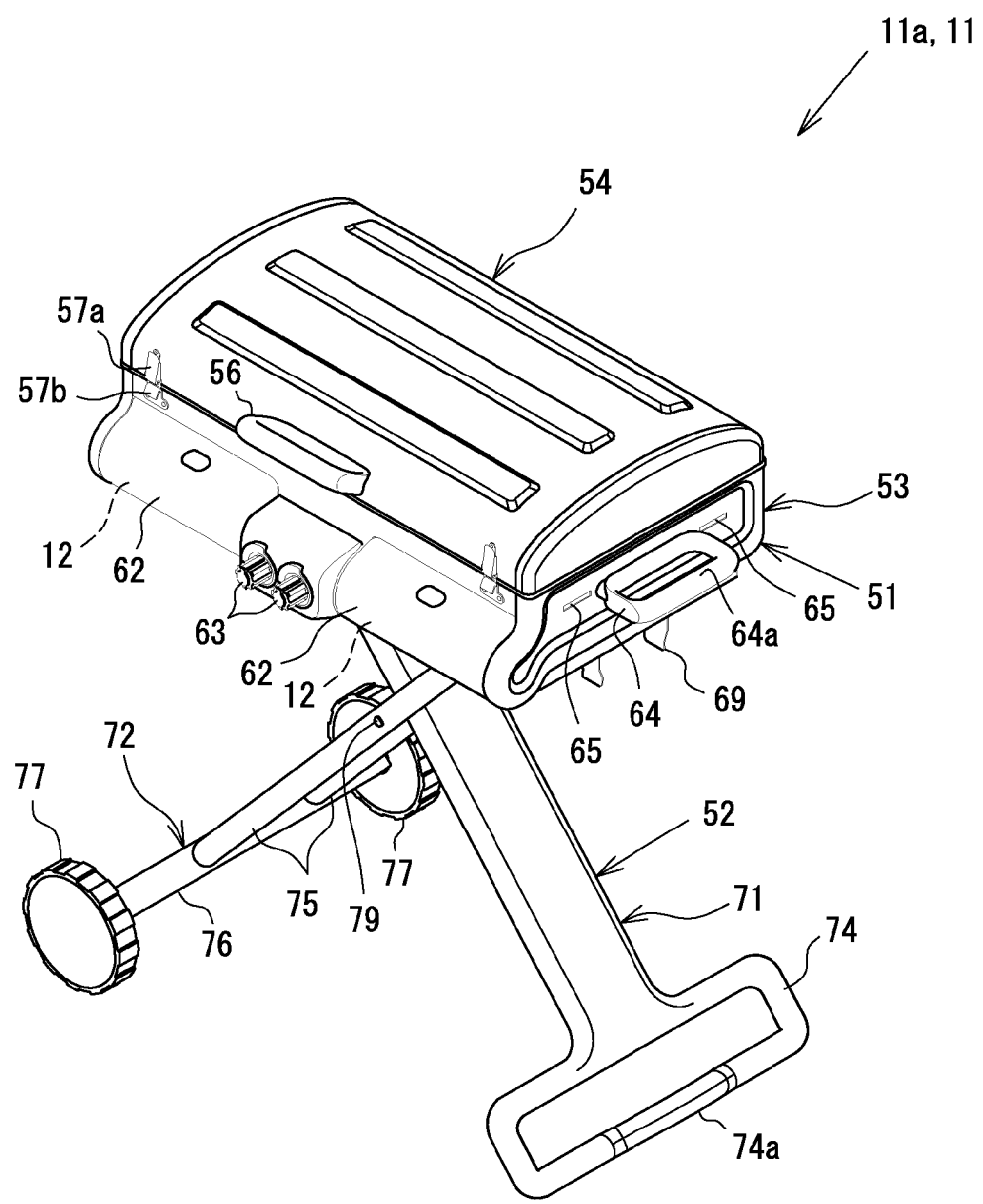
FIG. 3 is an isometric view of the barbecue grill with the lid being closed.

The grill main body 51 includes a container 53 and an openable/closable lid 54 which is pivotably attached to a top edge of a rear surface of the container 53. Referring to FIG. 3, in the state where the lid 54 is closed, the entire grill main body 51 has an external appearance having a generally semicircular cross-section. Namely, the lid 54 is hollow and has a thin, generally semicircular cross-section. As shown in FIG. 2, the lid 54 has a flat plate 55 fixed therein and thus has a flat inner surface. On the plate 55, notes for using the barbecue grill or the like may be written.

The lid 54 is provided with a handle 56 on a front part of a top surface thereof (the front part is opposite to the edge along which the lid 54 is pivotably attached to the grill main body 51). The lid 54 is also provided with first stoppers 57a at two positions, namely, a left position and a right position, at a bottom front edge thereof. The first stoppers 57a, together with second stoppers 57b described later, keep the grill main body 51 in the closed state. When the lid 54 is opened as shown in FIG. 2, the opening angle is kept by support rods 58. Ends of the support rods 58 are pivotably attached to left and right sides of the lid 54.

As shown in FIG. 2, the container 53 accommodates the two, namely, left and right, burners 13 which are directed upward. Around each burner 13, a support plate 59 is detachably attached. On the support plate 59, a quadropod 60 is detachably provided. The support plates 59 are attached such that edges thereof cover a top edge of an opening of the container 53. Instead of the quadropods 60, nets (not shown) may be used.

At left and right sides of the container 53, engaging members 61 protrude upward from below the support plates 59 and disengageably engage bottom ends of the support rods 58. The support plates 59 each have a cut-off part (not shown) to avoid the engaging members 61.

Figure 4:
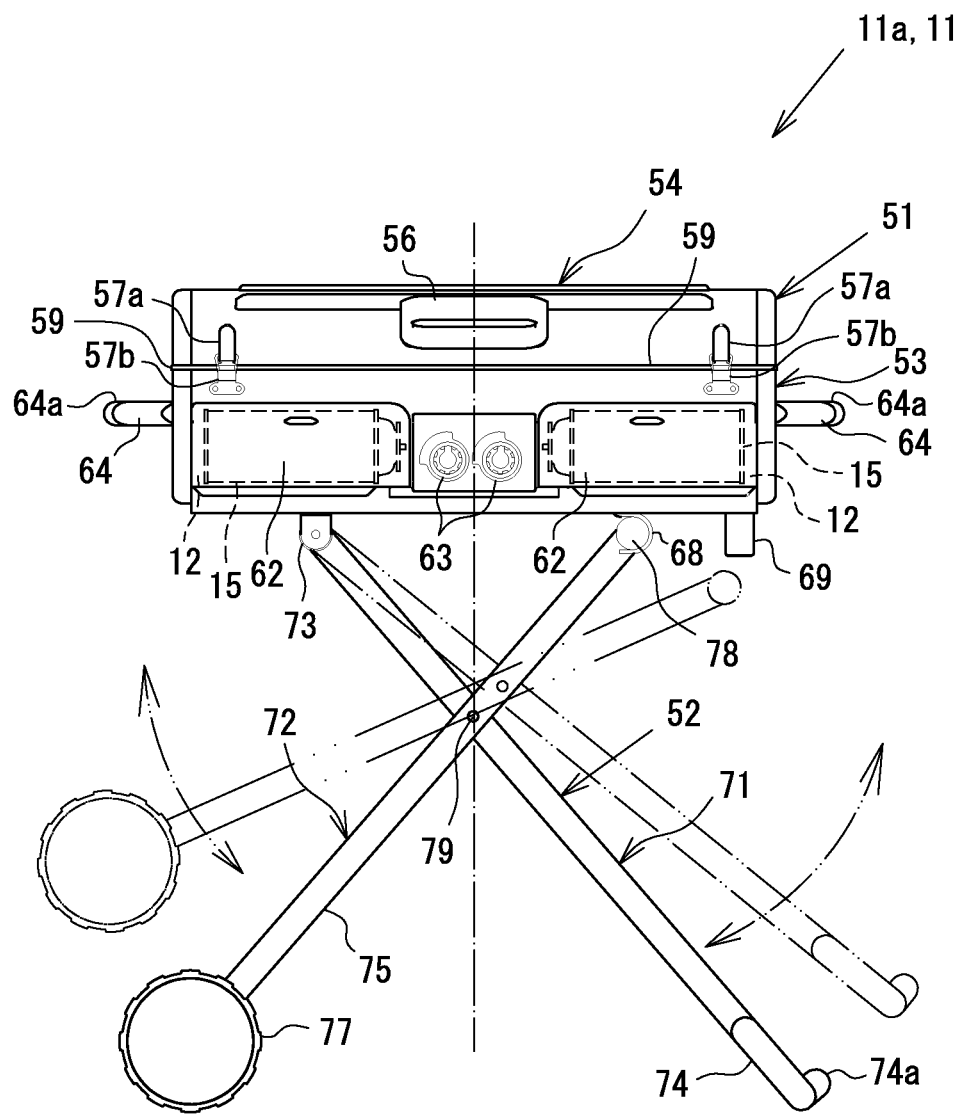
FIG. 4 is a front view of the barbecue grill.

The container 53 is also provided with the two, namely, left and right, gas container accommodation sections 12 on a front surface thereof. One gas container accommodation section 12 is provided in correspondence with one burner 13. As shown in FIG. 4, each gas container accommodation section 12 accommodates the gas container 15. The gas container accommodation sections 12 each have an openable/closable lid 62 at a front surface thereof. The gas containers 15 are accommodated in the gas container accommodation sections 12 such that gas ejection parts at tips of the gas containers 15 face each other.

Figure 5:
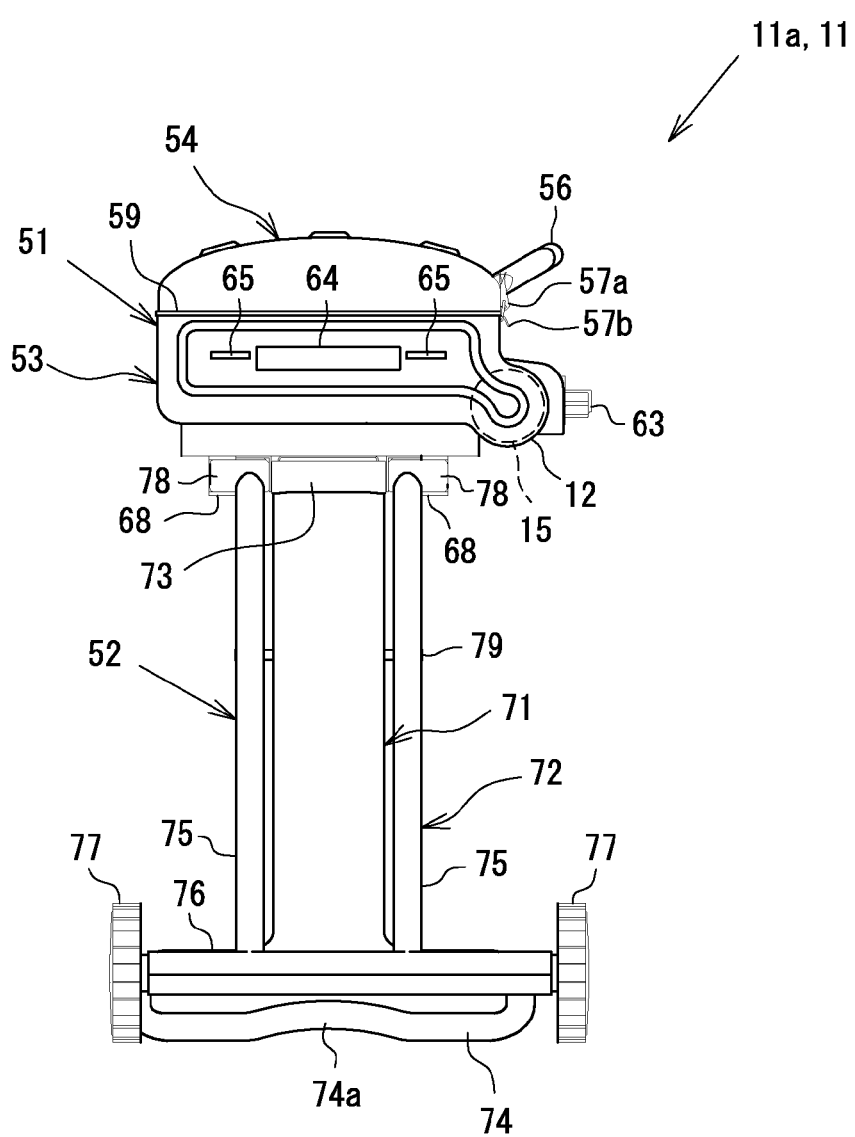
FIG. 5 is a left side view of the barbecue grill.
Figure 6:
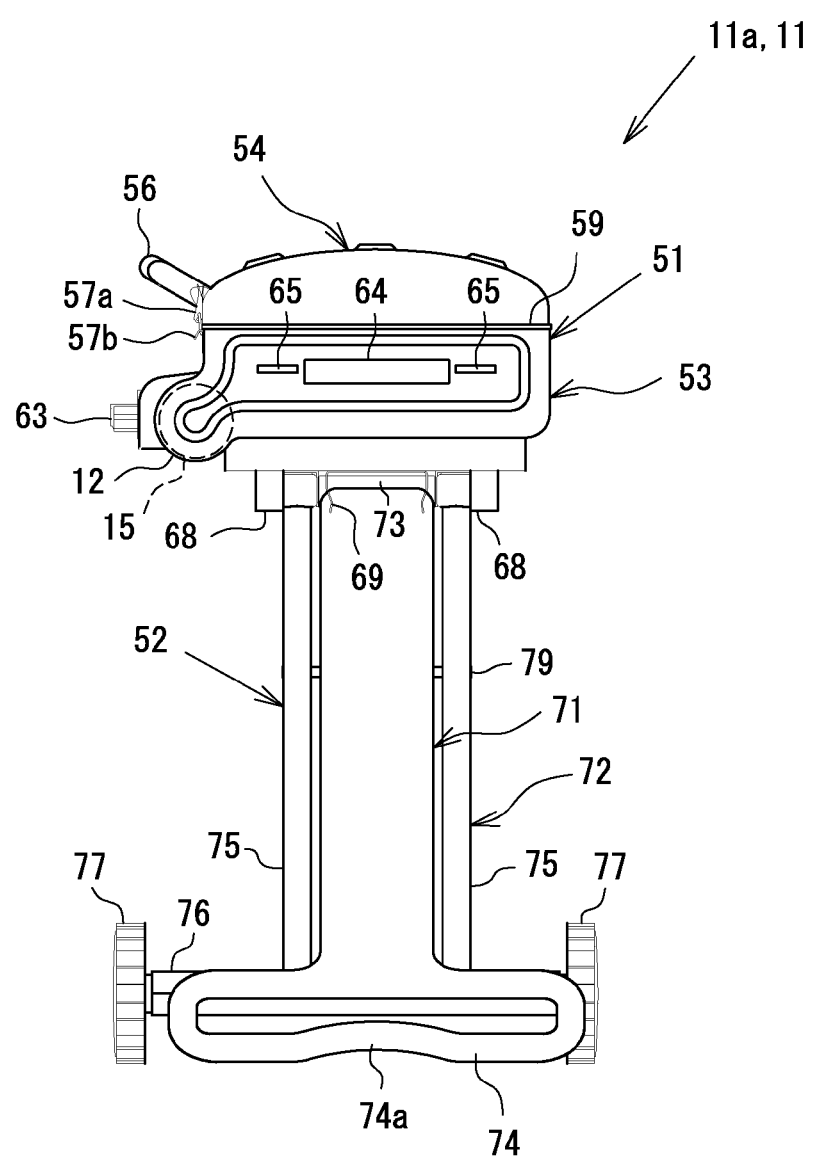
FIG. 6 is a right side view of the barbecue grill.

Since the container 53 is provided with the gas container accommodation sections 12, a bottom part of the front surface of the container 53 protrude forward and is round when seen in a side view as shown in FIG. 5 and FIG. 6.

As shown in FIG. 4 and the like, the container 53 is provided with the second stoppers 57b above the lids 62. The second stoppers 57b are respectively engageable with the first stoppers 57a provided on the lid 54.

As shown in FIG. 2, FIG. 3, FIG. 4 and FIG. 7(a), two operation knobs 63 for igniting the gas, extinguishing the fire, and adjusting the heat are rotatably provided on the front surface of the container 53 between the left and right gas container accommodation sections 12.

As shown in FIG. 2 through FIG. 8, handles 64 are provided on both of side surfaces of the container 53. Each handle 64 has a rectangular frame shape as seen in a plan view. The container 53 has laterally long, rectangular attachment holes 65 to the left and to the right of the handle 64 (see FIG. 2, FIG. 3, FIG. 5 and FIG. 6).

Figure 9:
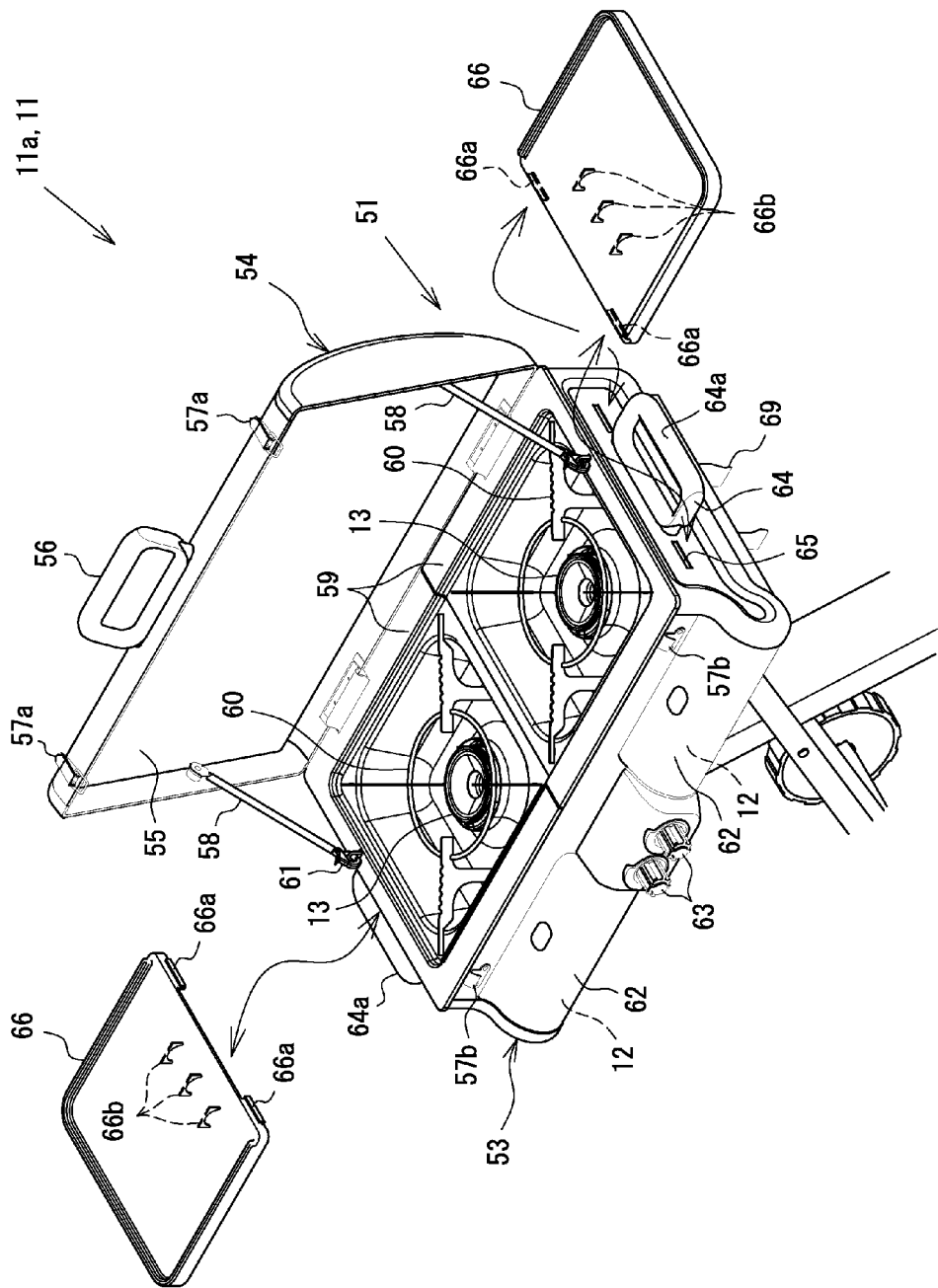
FIG. 9 is an exploded view of the barbecue grill which shows how to attach tables thereto.

As shown in FIG. 9, the attachment holes 65 are each provided for attaching a separate table 66. The table 66 is a square plate and includes engaging projections 66a which are L-shaped as seen in the front-rear direction of the barbecue grill 11a. The engaging projections 66a are provided on a surface facing the container 53, at positions corresponding to the attachment holes 65. The table 66 also includes engaging members 66b on a bottom surface thereof. The engaging members 66b are engageable from above with a part 64a, which is a part of the handle 64 that is located opposite to the container 53. The engaging projections 66a are engaged with the attachment holes 65, and the engaging members 66b are engaged with the part 64a. Thus, the table 66 is stably supported.

Figure 8:
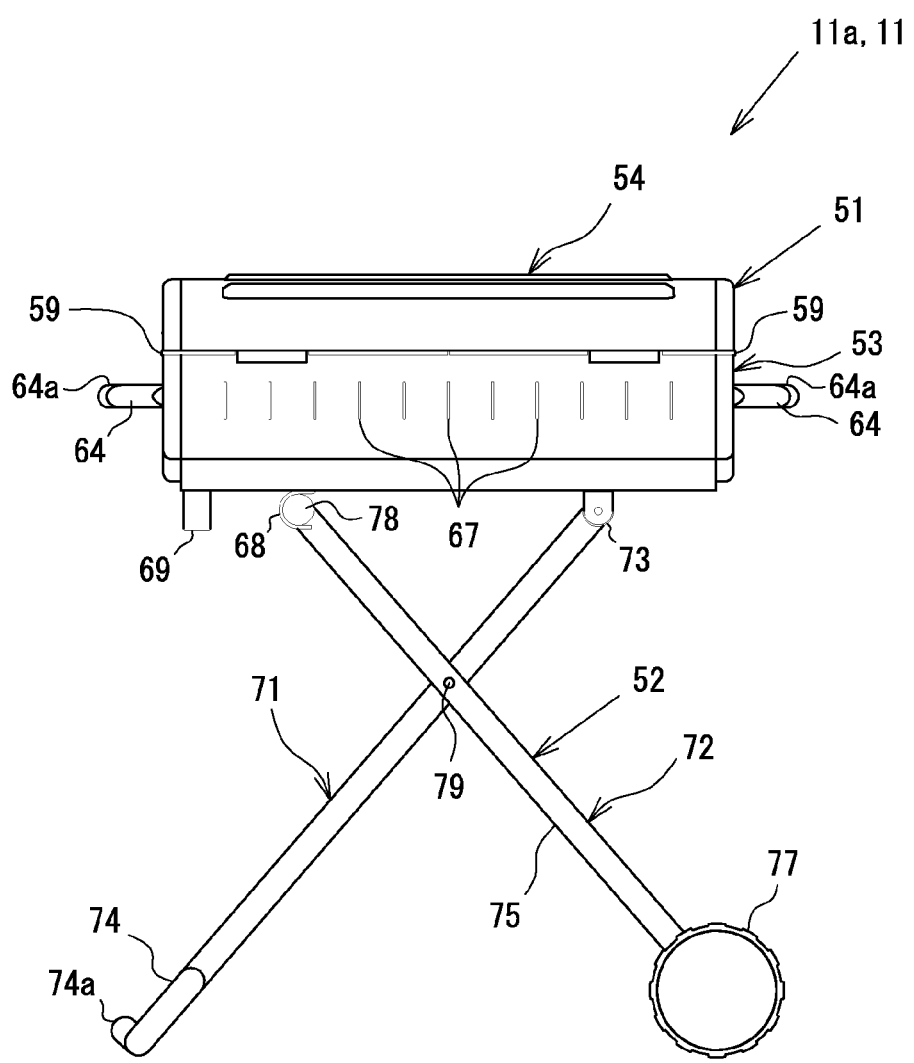
FIG. 8 is a rear view of the barbecue grill.

As shown in FIG. 8, the container 53 has a plurality of ventilation holes 67 on the rear surface thereof.

Figure 10:
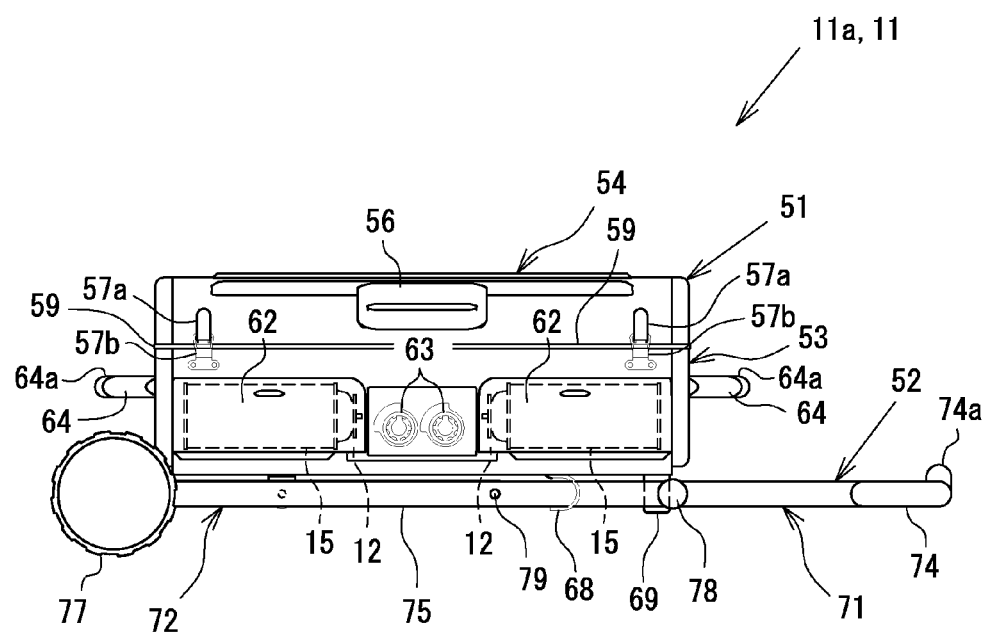
FIG. 10 is a front view of the barbecue grill in the state where a leg section is folded.

As shown in FIG. 4, FIG. 8 and FIG. 10, the container 53 is provided with the leg section 52 on a bottom surface thereof, and is also provided with open state keeping members 68 for keeping the leg section 52 in an open state and closed state keeping members 69 for keeping the leg section 52 in a closed (folded) state.

The leg section 52 includes two leg-shaped carriers which can be assembled to be in an X-shape as seen in a front view and are foldable in one straight line.

Figure 7A:
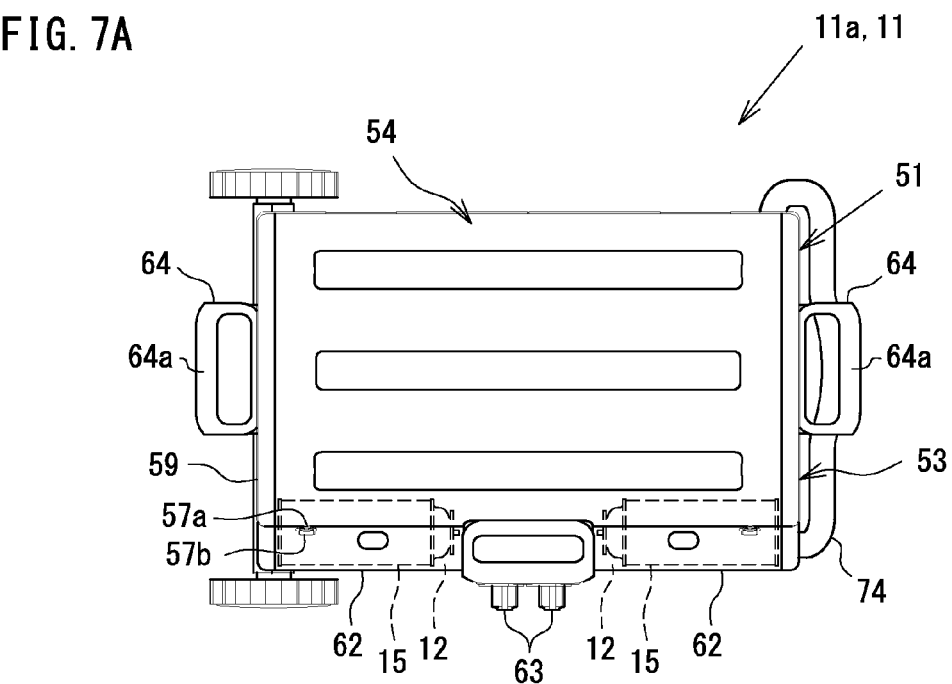
FIG. 7(a) is a plan view of the barbecue grill.
Figure 7B:
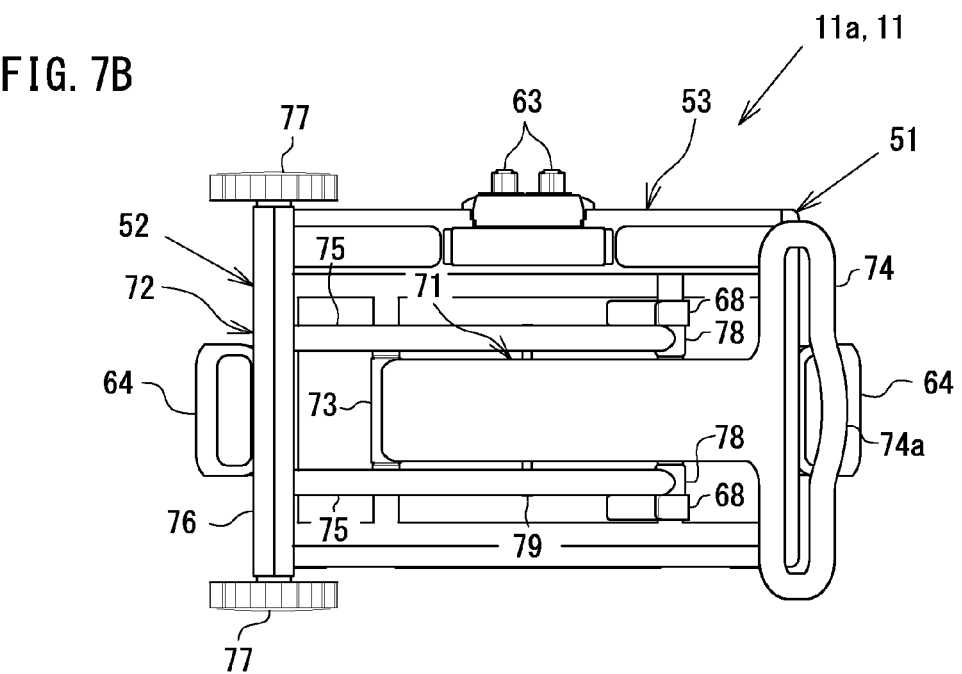
FIG. 7(b) is a bottom view thereof.

The two leg-shaped carriers include a handle-side leg-shaped carrier 71 and a wheel-side leg-shaped carrier 72. The handle-side leg-shaped carrier 71 has an overall thin plate-like shape, and as shown in FIG. 7(b), has a pivoting shaft 73 at a top end thereof and a handle 74, having a square frame shape, at a bottom end thereof. As shown in FIG. 4 and the like, the pivoting shaft 73 is pivotably attached to the bottom surface of the container 53. As shown in FIG. 6, the handle 74 has substantially the same width as that of the container 53 and thus is capable of supporting the grill main body 51 stably. The handle 74 has a curved part 74a at a middle position in a width direction of a bottom end thereof. The curved part 74a is provided so as to be above the ground when the other part of the handle 74 is in contact with the ground and thus to make the handle 74 easy to grasp.

As shown in FIG. 5, FIG. 6 and FIG. 7(b), the wheel-side leg-shaped carrier 72 includes two parallel leg rods 75 arranged so as to have the handle-side leg-shaped carrier 71 therebetween, a lateral shaft 76 provided so as to connect bottom ends of the leg rods 75 to each other, wheels 77 rotatably attached to the lateral shaft 76, and engaging shafts 78 provided at top ends of the leg rods 75 and protrude outward in the width direction of the wheel-side leg-shaped carrier 72. As shown in FIG. 5, the distance between the wheels 77 attached to the lateral shaft 76 is longer than a length of the grill main body 51 in the front-rear direction. The distance is set to such a length so that the grill main body 51 is supported stably and also so that the wheels 77 are outer to the grill main body 51 when the leg section 52 is folded and thus the leg section 52 does not need to be unnecessarily long. In other words, as shown in FIG. 10, even when the grill main body 51 overlaps the wheels 77 as seen in a front view, the rotation of the wheels 77 is not prevented.

A middle part in a longitudinal direction of each leg rod 75 of the wheel-side leg-shaped carrier 72 is pivotably attached to a middle part in a longitudinal direction of the handle-side leg-shaped carrier 71. As shown in FIG. 4, a pivoting part 79 at which each leg rod 75 is pivotably attached to the handle-side leg-shaped carrier 71 is set so as to positionally correspond to a middle position in the left-right direction of the container 53 when the wheel-side leg-shaped carrier 72 and the handle-side leg-shaped carrier 71 are assembled to be in an X-shape. Owing to this, the leg section 52 supports the grill main body 51 in a good balance. The container 53 is provided with the open state keeping members 68 on the bottom surface thereof. The open state keeping members 68 are engageable with the engaging shafts 78 of the wheel-side leg-shaped carrier 72 to hold the leg section 52 in an extended state.

As shown in FIG. 10, the container 53 is provided with the closed state keeping members 69 on the bottom surface thereof, at an end in the left-right direction. The closed state keeping members 69 are elastically displaceable. When the wheel-side leg-shaped carrier 72 and the handle-side leg-shaped carrier 71 are extended in one straight line, namely, are folded, the closed state keeping members 69 hold the thin plate-like part of the handle-side leg-shaped carrier 71 in the width direction to keep the folded state (see FIG. 3 and FIG. 4)

Figure 11:
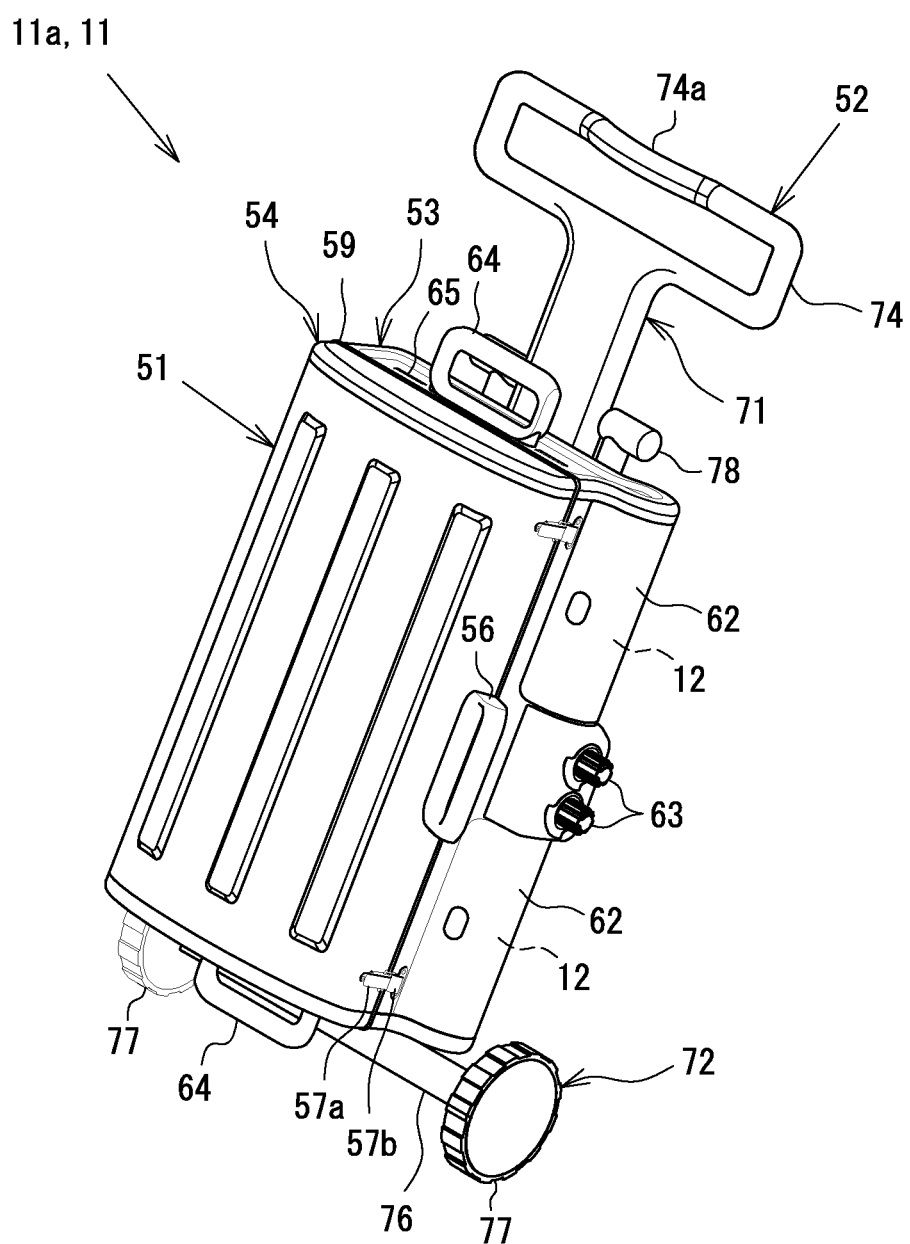
FIG. 11 is an isometric view of the barbecue grill which shows how to move the barbecue grill.

As shown in FIG. 11, when the leg section 52 is folded, the handle 74 of the handle-side leg-shaped carrier 71 is grasped and pulled up so that only the wheels 77 are in contact with the ground. Thus, the barbecue grill 11a is easily movable.

FIG. 1 shows an inner structure of the barbecue grill 11a. As shown in FIG. 1, the left and right burners 13 are each provided with an ignition section 16 formed of an ignition plug for igniting the gas and a flame detection section 17 formed of a flame rod. The two gas flow paths for respectively supplying gas to the burners 13 each have an open/close valve 18 for adjusting the gas flow independently. Each open/close valve 18 is formed of an electromagnetic valve such as a solenoid valve or the like.

Figure 12:
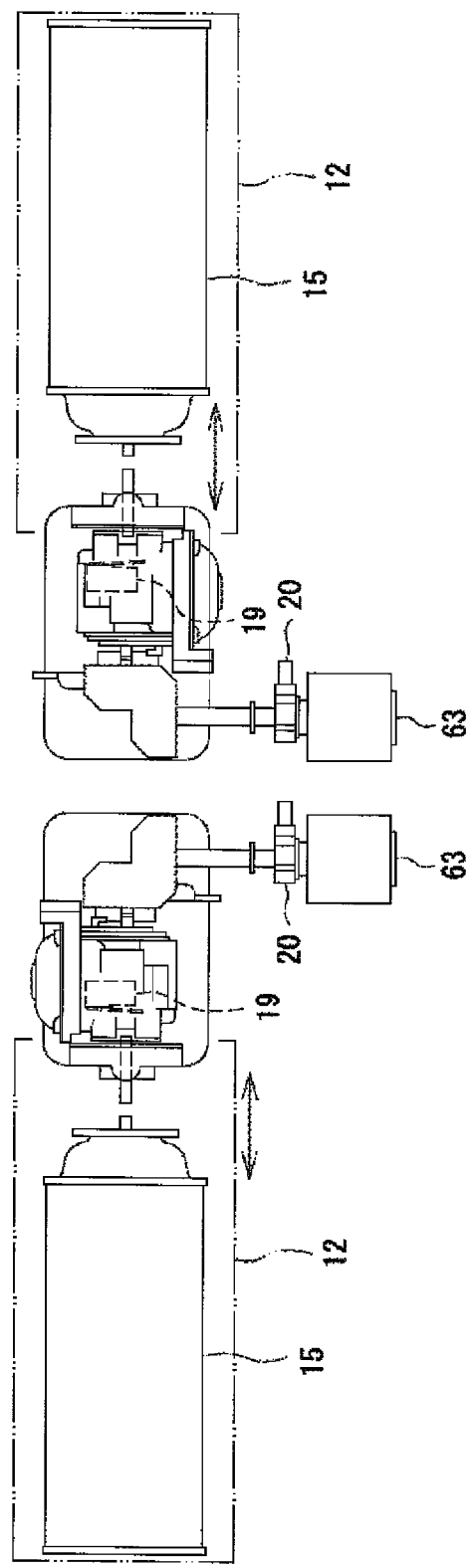
FIG. 12 is a plan view showing a schematic structure of a part of the barbecue grill including operation knobs and the gas container accommodation sections.

As also shown in FIG. 12, the two gas container accommodation sections 12, for respectively accommodating the gas containers 15 filled with gas, are each provided with a container attachment switch 19 for detecting that the gas container 15 is connected. The container attachment switch 19 is structured so as to be ON when the gas container 15 is pushed into the gas container accommodation sections 12 to realize a state where gas is provided. When both of the left and right container attachment switches 19 are ON, ignition switches 20 for igniting the burners 13 are put into a valid state. The term "valid" means that the function of the ignition switches 20 is valid.

As shown in FIG. 1 and FIG. 12, the operation knobs 63 are provided in correspondence with the left and right gas container accommodation sections 12. The operation knobs 63 are respectively provided with the ignition switches 20 each formed of a microswitch or the like. The ignition switches 20, when being in a valid state, open or close the open/close valves 18 in the gas flow paths and cause the ignition sections 16 provided at the burners 13 to ignite the gas.

Temperature sensors 21 for detecting overheating of mounted electronic devices are provided at appropriate positions in correspondence with the burners 13 (see FIG. 1).

Figure 13:
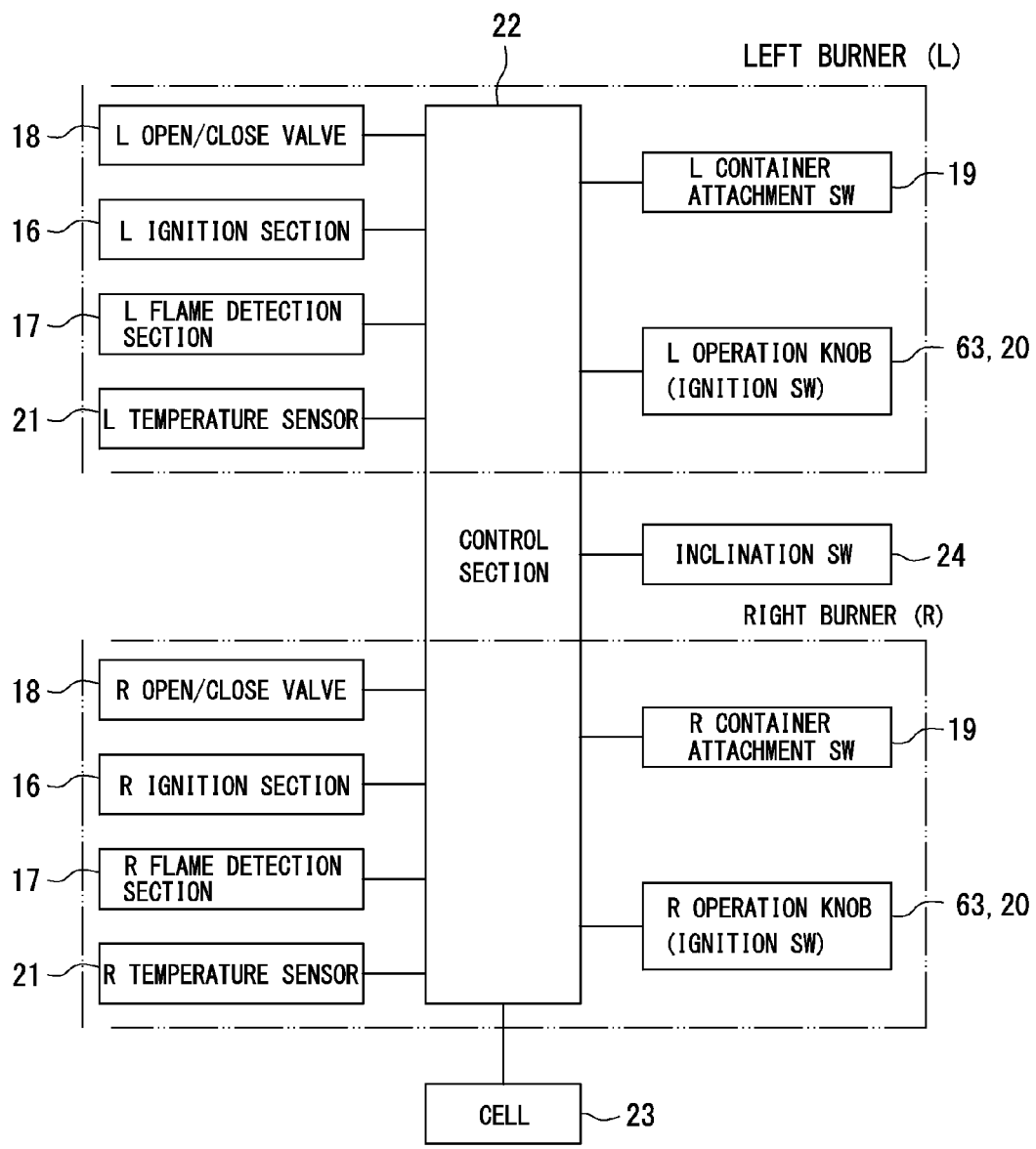
FIG. 13 is a block diagram of an inner structure of the barbecue grill.

As shown in FIG. 13, the container attachment switches 19, the open/close valves 18, the ignition switches 20, the ignition sections 16, the flame detection sections 17, and the temperature sensors 21 are connected to a control section 22. The control section 22 controls operations of these elements. The control section 22 is also connected to a cell 23 for supplying electric power and an inclination switch (vibration switch) 24 for detecting an inclination state of the barbecue grill 11a.

The control section 22 is formed of a sequencer, and controls and drives the ignition sections 16, the open/close valves 18 and the like based on a pre-stored program in accordance with an input from the operation knobs 63 and the like. On a storage section (not shown) of the control section 22, information necessary for the control and driving is stored.

With reference to the flowcharts in FIG. 14 and FIG. 15, the control operations executed by the control section 22 and the flow thereof will be described.

The control section 22 controls the ignition switches 20 to be valid under the condition that the control section 22 receives an ON signal from all the container attachment switches 19.

Figure 14:
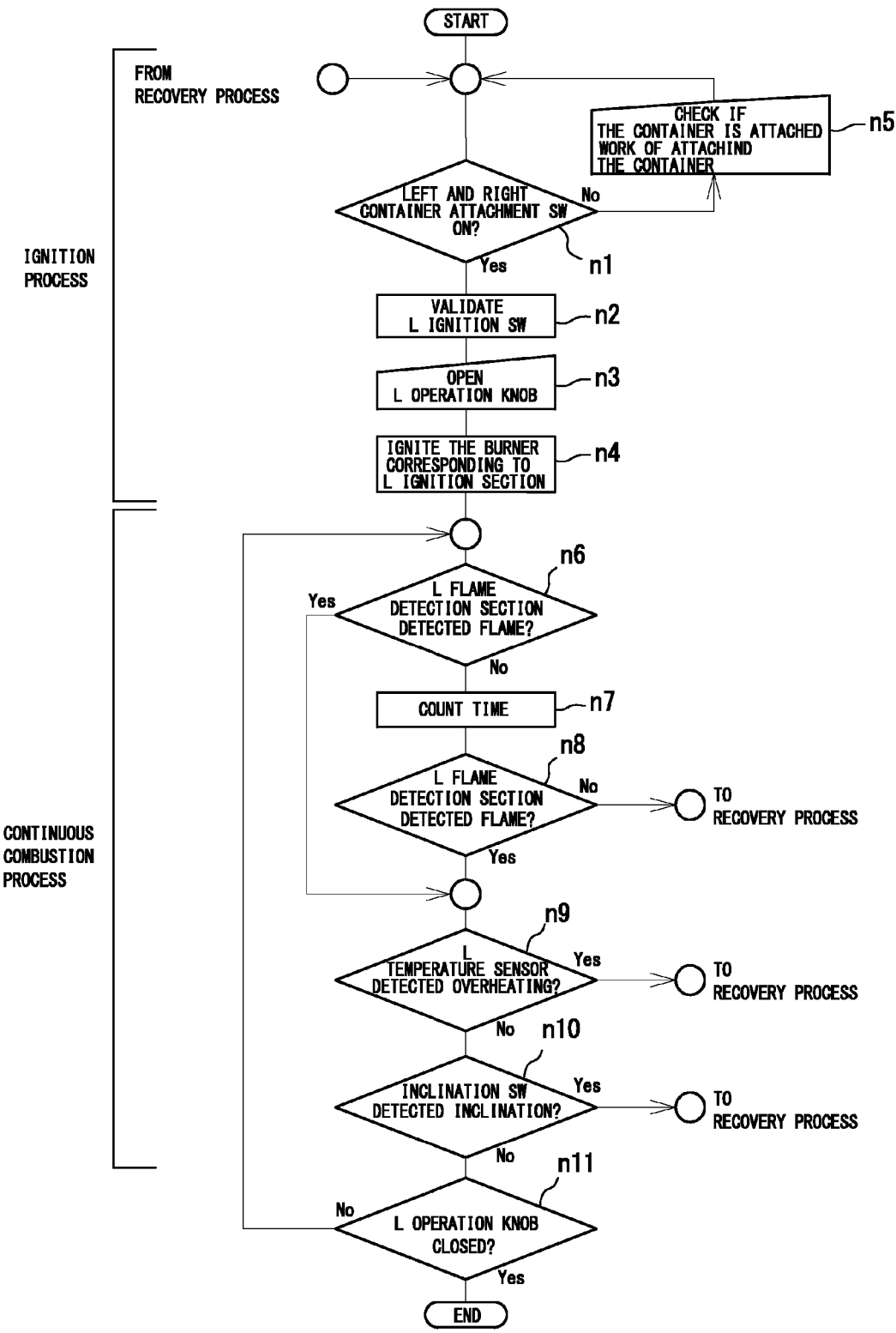
FIG. 14 is a flowchart showing an ignition process and a continuous combustion process performed on the barbecue grill.

Namely, the control section 22 executes the operation shown in the "ignition process" part of FIG. 14. When determining that both of the left and right container attachment switches 19 are ON (YES in step n1), the control section 22 validates the ignition switch 20 (step n2). When the operation knob 63 is rotated to an open position (step n3), the ignition switch 20 is turned ON. At the same time, a signal indicating that the ignition switch 20 has been turned ON is transmitted to the control section 22. Then, the control section 22 opens the open/close valve 18 to supply gas to the burner 13, and drives the ignition section 16 to ignite the burner 13 (step n4). FIG. 14 shows the ignition of the left burner 13. Ignition of the right burner 13 is performed in the same manner.

When both of the left and right container attachment switches 19 are OFF, or when either one of the container attachment switches 19 is OFF, the ignition switch 20 is not validated unless the work of attaching the container (step n5) is made.

When the gas in the burner 13 is ignited and combusted, the flame detection section 17 detects flame and transmits a signal indicating that the flame has been detected to the control section 22. When the temperature sensor 21 detects a temperature higher than a prescribed set temperature, the temperature sensor 21 transmits a signal indicating overheating to the control section 22.

When the control section 22 receives a signal indicating that there is no flame in the burner 13 (extinguished state) based on the detection made by the flame detection section 17, or when the control section 22 receives a signal indicating that the electronic device is in an overheated state based on the detection made by the temperature sensor 21, namely, in an abnormal state, the control section 22 executes control of closing the open/close valve 18 provided for supplying gas to the burner 13 on the side from which such a signal indicting the abnormal state is transmitted, and also of closing the open/close valve 18 corresponding to the other burner 13.

Namely, the control section 22 executes the operation shown in the "continuous combustion process" part in FIG. 14. When the flame detection section 17 does not detect flame and thus the control section 22 determines that there is no flame in the burner 13 (NO in step n6), the control section 22 counts a prescribed time duration, for example, about several seconds (step n7). When receiving no signal indicating that flame has been detected from the flame detection section 17 during the time duration (NO in step n8), the control section 22 determines that the burner 13 has run out of gas or the fire has gone out. The control section 22 transfers the control to the "recovery process" shown in FIG. 15 and closes the open/close valves 18 corresponding to all the burners 13.

In the above, the control executed by the control section 22 when the flame is extinguished while the gas is combusted is described. The control section 22 executes the same control when the burner is out of gas at the time of ignition or when it is impossible to ignite the gas due to a strong wind.

As long as the flame detection section 17 detects flame (YES in step n6), the combustion is continued unless the flame needs to be extinguished due to any other abnormality or the flame is intentionally extinguished.

Figure 15:
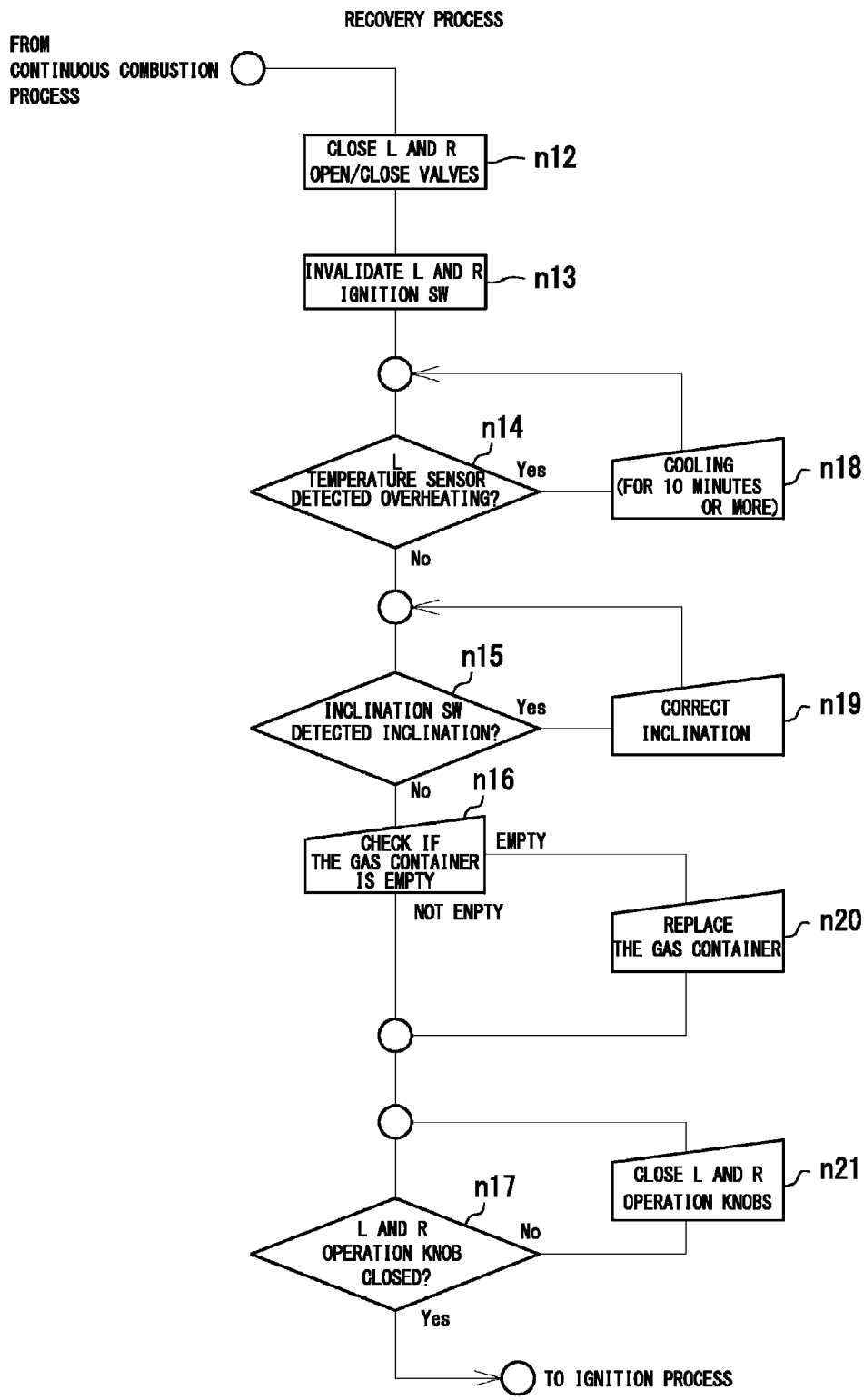
FIG. 15 is a flowchart showing a recovery process performed on the barbecue grill.

When the temperature sensor 21 detects that an electronic device is overheated to a temperature equal to or higher than a prescribed temperature (YES in step n9) while the gas is combusted and the control section 22 receives a signal indicating the overheating, the control section 22 promptly transfers the control to the recovery process shown in FIG. 15 and closes the open/close valves corresponding to all the burners 13.

When the temperature sensor 21 does not detect overheating (NO in step n9), the combustion is continued unless the flame needs to be extinguished due to any other abnormality or the flame is intentionally extinguished.

Such abnormalities include detection by the inclination switch 24 in addition to the extinguishment of the flame and the overheating. More specifically, while the barbecue grill 11a is in use, when the grill main body 51 is not placed horizontally or when the barbecue grill 11a is moved as a result of inadvertent collision or contact with something, the inclination switch 24 detects an inclination (vibration) made at an angle equal to or larger than a prescribed angle. When the control section 22 receives a signal indicating such an inclination (YES in step n10), the control section 22 determines that safe use is not guaranteed and thus promptly transfers the control to the "recovery process" shown in FIG. 15 and closes the open/close valves 18 corresponding to all the burners 13.

When the inclination switch 24 does not detect such an inclination (NO in step n10), the combustion is continued unless the flame needs to be extinguished due to any other abnormality or the flame is intentionally extinguished.

When the operation knob 63 is rotated to a close position while the gas is combusted, the ignition switch 20 corresponding to the operation knob 63 is turned OFF. The control section 22 receives a signal indicating that the ignition switch 20 has been turned OFF (YES in step n11), and closes the corresponding open/close valve 18. As a result, the combustion in the burner 13 corresponding to the operation knob 63 is stopped.

When the operation knob 63 is not at the close position (NO in step n11), the combustion is continued unless the flame needs to be extinguished due to any other abnormality.

FIG. 14 shows detection of an abnormality and the like regarding the combustion in the left burner 13. The control section 22 executes the same control regarding the combustion in the right burner 13.

When an abnormality occurs, the control section 22 executes the recovery process by controlling either one of the ignition switches 20 to be valid under the condition that all the operation knobs 63 corresponding to the burners 13 are all closed once.

More specifically, as shown in FIG. 15, when an abnormality occurs, the control section 22 closes the left and right open/close valves 18 (step n12) and turns the left and right ignition switches 20 OFF to put the ignition switches 20 from the valid state to an invalid state (step n13). Namely, the control section 22 invalidates the function of the ignition switches 20. As a result, the flame is extinguished in the left and right burners 13 even if the operation knobs 63 are not at the close position.

For resetting the control and transferring the control to the "ignition process" described above, the following conditions need to be all fulfilled: the control section 22 does not receive a signal indicating overheating from the temperature sensor 21 (NO in step 14); the control section 22 does not receive a signal indicating an inclination from the inclination switch 24 (NO in step n15); and the gas remains in the gas container 15 (in step n16). In the case where these conditions are all fulfilled, the control is reset and transferred to the "ignition process" when the left and right operation knobs 63 are rotated to the close position (YES in step n17), namely, when the control section 22 receives an OFF signal (signal indicating that the corresponding ignition switch 20 has been turned OFF) from the left and right ignition switches 20.

When the control section 22 receives a signal indicating that overheating has been detected from the temperature sensor 21 (YES in step 14), the control cannot be transferred to the "ignition process" as long as the temperature sensor 21 detects overheating. In this case, the control cannot be transferred to the "ignition process" even after a cooling measure (step n18) of, for example, cooling the barbecue grill 11a for a prescribed time duration of, for example, 10 minutes or longer is taken, even if the left and right operation knobs 63 are at the close position.

Similarly, as tong as the control section 22 receives a signal indicating that an inclination has been detected from the inclination switch 24, the control cannot be transferred to the "ignition process" unless the inclination of the barbecue grill is corrected (step n19) even if the left and right operation knobs 63 are at the close position.

In the case where the control is transferred to the recovery process for the reason that the flame is extinguished, the gas container 15 may be possibly out of gas. In such a case, the empty gas container 15 may be replaced with another gas container (step n20) so that the burner 13 corresponding to the new gas container 15 can be put into an ignitable state.

When the operation knobs 63 are not at the close position and the control section 22 receives no OFF signal from the ignition switches 20, the control can be transferred to the ignition process after the control section 22 receives an OFF signal from the ignition switches 20 based on the rotation of the left and right operation knobs 63 to the close position (step n21).

Owing to the above-described structure, the barbecue grill 11a has the following functions and effects.

The control section 22 controls the ignition switch 20 so as not to be validated, namely, so as not to be turned ON unless the left and right container attachment switches 19 are turned ON. Therefore, a spare container cannot be incorporated before ignition. This guarantees safety. In addition, such a control is executed electrically. Unlike in the case where incorporation of a spare container is prevented by a physical structure, deformation of, or damage to, components does not occur. Therefore, desired functions and effects are provided with improved certainty.

The left and right operation knobs 63 are independent from each other and are not physically connected to each other, and therefore are rotated freely and separately. Namely, heat can be, for example, adjusted while the gas is combusted by each operation knob 63 independently. Such an inconvenience that the operation made on one operation knob 63 influences the other operation knob 63 does not occur. This provides good workability and ease of use.

When a situation where continuation of combustion is not desirable in terms of safety occurs for the reason that the flame is extinguished, abnormal overheating is caused, or the barbecue grill is inclined for some reason, the control section 22 promptly transfers the control to the recovery process. Specifically, the control section 22 closes the left and right open/close valves 18 to stop supply of the gas and invalidate the left and right ignition switches 20. This guarantees safety. Once the left and right ignition switches 20 are invalidated, the gas cannot be ignited unless all the abnormalities are eliminated and all the operation knobs 63 are rotated to the close position to reset the barbecue grill 11a.

Namely, when, for example, one of the gas containers 15 becomes empty while the gas is combusted in the left and right burners 13, the control section 22 closes the open/close valves 18 to stop the combustion of the gas in the left and right burners 13. In addition, the control section 22 invalidates the ignition switches 20. Therefore, there is no undesirable possibility that gas inadvertently leaks or catches fire during the replacement of the empty gas container 15. This provides high safety.

Moreover, the barbecue grill 11a can be reset by a highly simple operation of rotating the left and right operation knobs 63 to the close position.

As described above, the barbecue grill 11a includes the grill main body 51 including the operable/closable lid 54 and the foldable leg section 52 for supporting the grill main body 51. Owing to this structure, the barbecue grill 11a is easy to move and thus is usable in various sites. The barbecue grill 11a, which is used in the state where the lid 54 is open, is influenced by wind or the like. Therefore, the above-described structure for guaranteeing safety in various situations is highly effective. Moreover, the recovery process can be started merely by rotating the operation knobs 63. This can be performed easily even outdoors and thus the barbecue grill 11a is convenient to use.

The cartridge-type gas grill according to the present invention corresponds to the cartridge-type gas grill 11 and the barbecue grill 11a in the above-described embodiment. However, the present invention is not limited to the above-described embodiment.

For example, the cartridge-type gas grill 11 may include three or more gas container accommodation sections 12.

The cartridge-type gas grill 11 may be a grill other than the barbecue grill 11a.

DESCRIPTION OF THE REFERENCE NUMERALS

11 . . . Cartridge-type gas grill
11a . . . Barbecue grill
12 . . . Gas container accommodation section
13 . . . Burner
15 . . . Gas container
17 . . . Flame detection section
18 . . . Open/close valve
19 . . . Container attachment switch
20 . . . Ignition switch
21 . . . Temperature sensor
22 . . . Control section
63 . . . Operation knob

What is claimed is:

1. A cartridge-type gas grill having a plurality of systems, comprising:
   a plurality of gas container accommodation sections;
   burners of the same number as that of the gas container accommodation sections; and
   gas flow paths for connecting the gas container accommodation sections and the burners in a one-to-one relationship;
   wherein:
   the gas container accommodation sections are each provided with a container attachment switch that is turned on when a gas container is pushed into the gas container accommodation section and is in a state where gas is provided;

open/close valves, provided in the gas flow paths, for adjusting a gas flow are each formed of an electromagnetic valve;

operation knobs each for making an operation on the corresponding open/close valve are each provided with an ignition switch, which is turned ON when the corresponding open/close valve is opened and is turned OFF when the corresponding open/close valve is closed;

the container attachment switches, the open/close valves, and the ignition switches are connected to a control section; and the control section enables the ignition switches to operate the open/close valves and allow the burners to ignite gas in the gas flow under a condition that the control section receives an ON signal from all of the container attachment switches.

2. A cartridge-type gas grill according to claim 1, further comprising:

flame detection sections for detecting flame in the burners respectively; and temperature sensors each for detecting overheating of an electronic device mounted on the cartridge-type gas grill;

wherein:

the flame detection sections and the temperature sensors are connected to the control section; and when receiving a signal indicating at least one of the burners is out of flame based on the detection of the corresponding flame detection section or when receiving a signal indicating that the electronic device is overheated based on the detection of the corresponding temperature sensor, the control section executes control of closing the corresponding open/close valve provided for supplying gas to the at least one burner and closing the open/close valves(s) of the other burner(s).

3. A cartridge-type gas grill according to claim 2, wherein once an abnormality occurs, the control section enables either one of the ignition switches to operate the open/close valves and allow the burners to ignite gas in the gas flow under a condition that the operation knobs corresponding to all the burners are all closed once.

4. A cartridge-type gas grill according to claim 1, wherein each of the gas container accommodation sections are configured to hold a cartridge-type gas container.

* * * * *